June 11, 1935.  J. J. ALLISON ET AL  2,004,846
TRACTOR DRAWN GRADER
Filed July 9, 1934    4 Sheets-Sheet 1
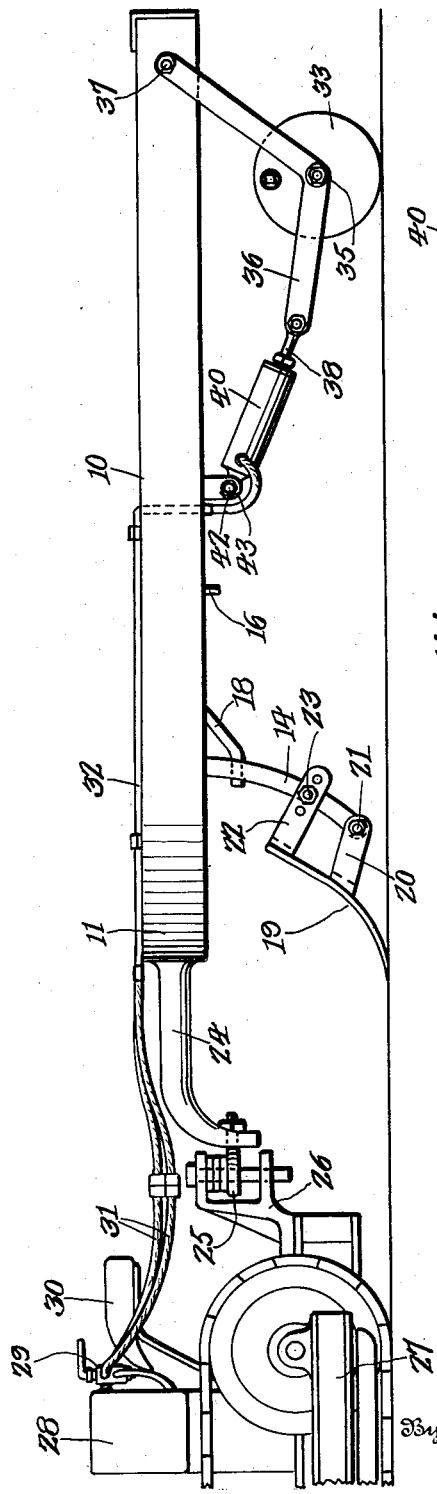
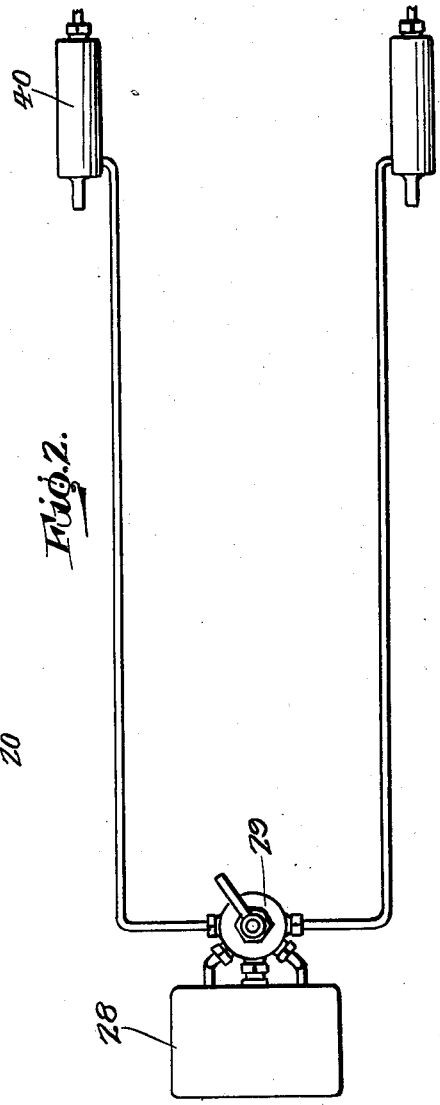
Inventors
John James Allison
James Pleasant Ivy
By Geo. F. Kimmel
Attorney

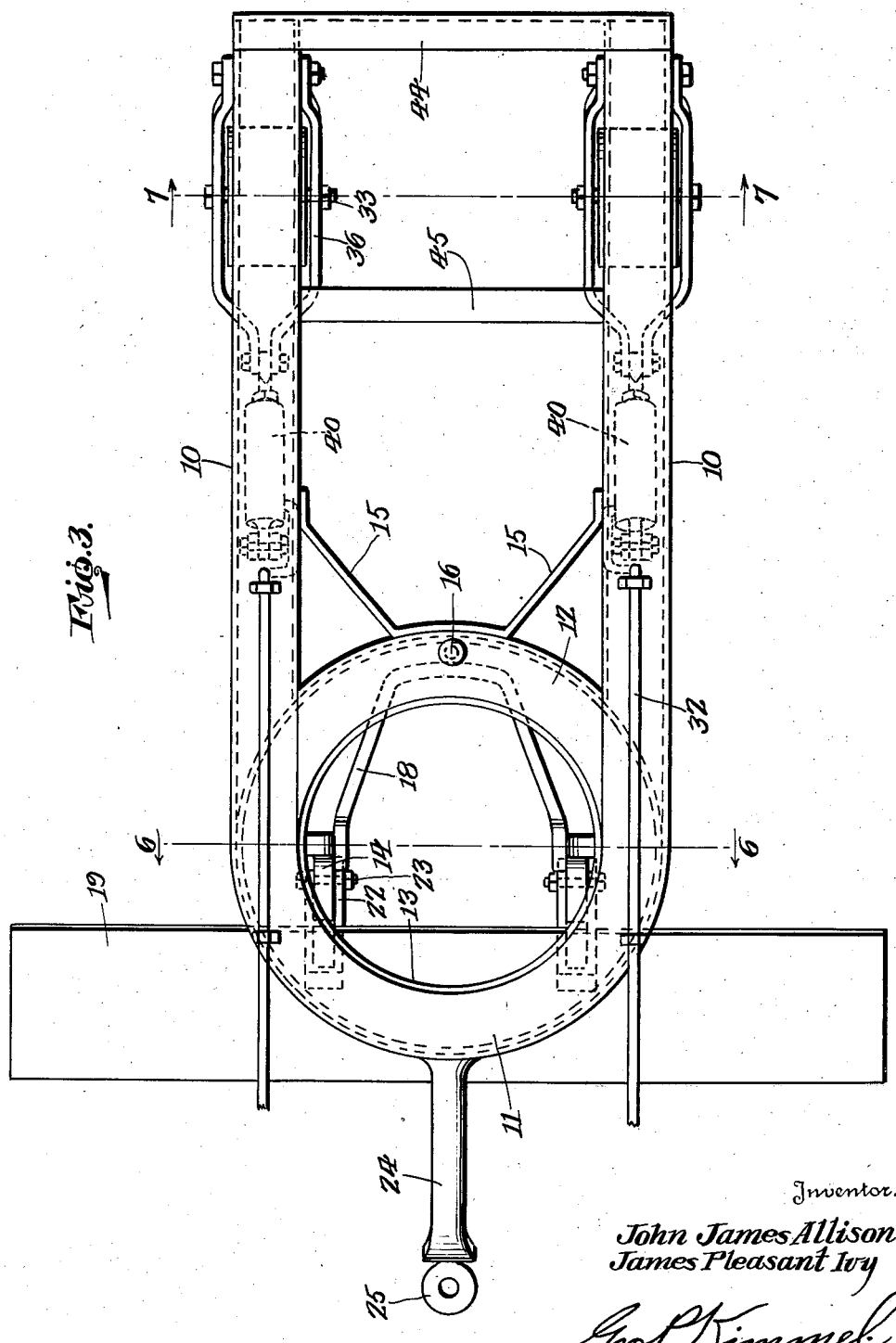

June 11, 1935.  J. J. ALLISON ET AL  2,004,846
TRACTOR DRAWN GRADER
Filed July 9, 1934  4 Sheets-Sheet 3
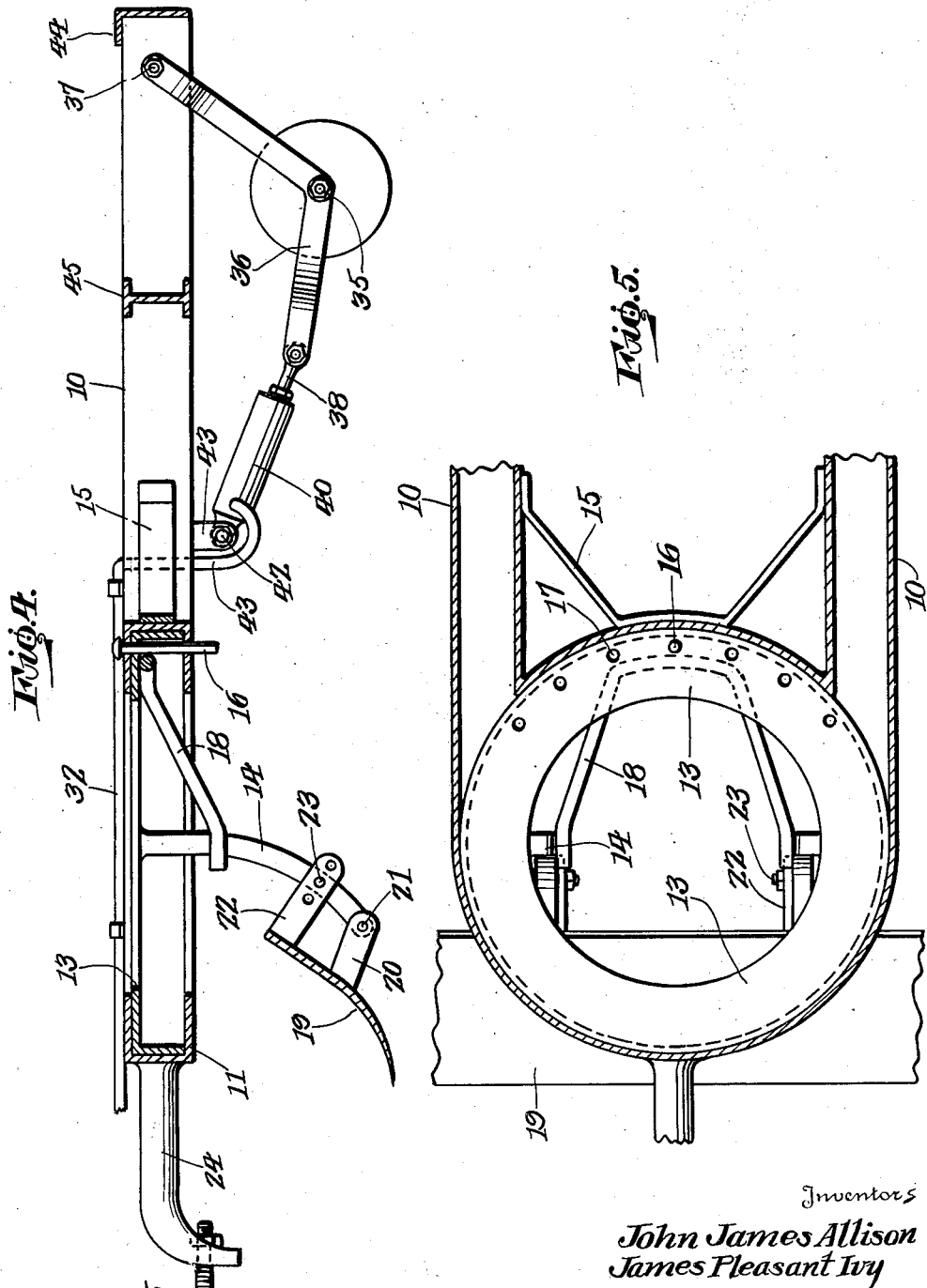
Inventors
John James Allison
James Pleasant Ivy
By Geo. P. Kimmel
Attorney

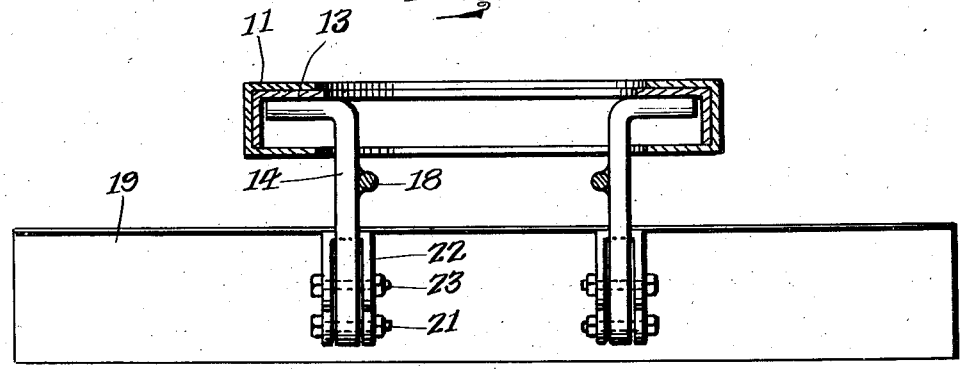
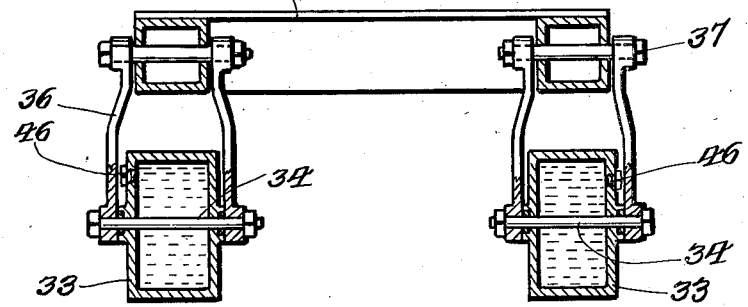
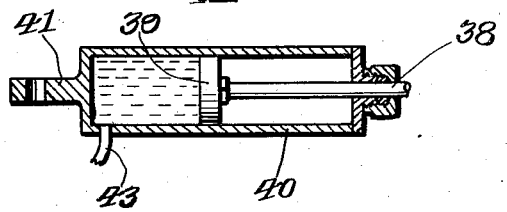

Patented June 11, 1935

2,004,846

UNITED STATES PATENT OFFICE 2,004,846

TRACTOR DRAWN GRADER

John James Allison and James Pleasant Ivy, Chandler, Ariz.

Application July 9, 1934, Serial No. 734,398

5 Claims. (Cl. 37—164)

This invention relates to tractor drawn graders which while capable of general scraping and grading operations is especially designed and adapted for grading operations in connection with irrigated lands, and for this reason has for one of its primary purposes the provision of a lasting efficient machine, capable of control in its operation, and of the adjustments usually made during such operation, by the single operator necessary for the control and operation of the tractor itself.

Among its further objects the invention contemplates maximum of ease and flexibility in the various adjustments made essential by the chosen use of the invention as above set forth, these adjustments including the setting or angular position of the blade usually accomplished at the start of operations, and also the vertical adjustment at either one or both sides of the blade which so frequently becomes necessary during operation.

Still further, the invention contemplates a tractor drawn grader so arranged and adjustable as to permit of throwing the full weight of the machine on the blade and insuring uniformly effective results, and the invention also contemplates many details in the structure arrangement, support, adjustment and cooperation of its various parts, mutually contributing to the strength, durability, and, at the same time, simplicity of the machine as a whole.

With the above and certain other objects in mind, the invention may be better understood and more thoroughly appreciated by reference to the following description of its various features, and with regard to the accompanying drawings, which form a part of this specification, and in which, Figure 1 is a side elevation of the complete grader showing certain parts of the tractor utilized in the drawings thereof, Figure 2 is a diagrammatic plan view showing the pressure generator and the rear wheel control cylinders with their pressure connections, Figure 3 is a top plan view of the complete grader, Figure 4 is a vertical longitudinal section taken centrally through the grader, Figure 5 is a horizontal section taken through the forward portion of the frame, Figures 6 and 7 are vertical transverse sections taken respectively on lines 6—6 and 7—7 of Figure 3, and Figure 8 is a detail longitudinal section taken through one of the wheel control cylinders.

Referring now to these figures, the frame of the grader includes a pair of spaced apart parallel side bars 10, whose curved forward ends are united approximately in a semicircle as at 11 and whose forward portions are connected by a curved cross member 12 which forms with the said curved forward portions 11 of the side bars, a circular housing. This housing, irrespective of the particular shape of the major portions of the side bars, presents an inwardly opening channel as may be plainly seen in Figures 4 and 6 and in this channel is movably disposed a turntable 13 formed, for example, from an angle bar and provided at diametrically opposite points with depending forwardly curved blade supporting bars 14.

The cross member 12, which forms a part of the above housing, and which may be additionally supported from the frame side bars 10 by a cross saddle 15 has, at a point intermediate its ends, vertically aligned openings for the reception of an anchor bolt 16, and the turntable 13 has a series of openings 17 (see Figure 5), along a portion thereof, selected ones of which may be brought into registry with the aligned openings of the cross member 12 to receive the anchor bolt 16 and thus anchor the turntable 13 in selected position.

The depending blade supporting bars 14 are preferably supported and braced by a generally U-shaped brace member 18 whose extremities are made fast to the bars 14 intermediate the ends of the latter, and substantially below the turntable 13, and whose bight portion is similarly made fast to the turntable.

The blade 19 which, in use, extends generally in a direction transverse to the longitudinal axis of the machine, and as shown is transversely curved to provide a forwardly set lower cutting edge, has rearwardly projecting pivotal arms 20 pivotally connected at 21 to the lower extremities of the blade supporting bars 14. Above these pivoted arms, and at or about its upper edge, the blade 19 has rearwardly extending adjusting arms 22, each provided with a series of openings, selected ones of which may receive clamping bolts 23 extending also through the bar 14 at points above the lower blade pivots, so that the transverse inclination of the blade 19 may be readily changed from time to time, as occasion or the nature of the work requires.

Obviously, by the use of the turntable adjustment, the angular setting of the blade 19 with respect to the longitudinal axis of the machine may be varied, as the material is to be thrown more or less to the right or left side of the machine.

Centrally of its forward curved portion 11 the frame has a forwardly projecting hitch bar 24, the forward downturned portion of which bar supports a swiveled connecting ring 25 for adjustable connection with the rear clevis 26 of a tractor generally indicated at 27 in Figure 1, and which for most purposes will preferably be of the caterpillar type.

For a purpose which will be presently plain, there is mounted on the tractor 27 a pressure generator in the nature of a pump generally indicated at 28, having high and low pressure connections with a four-way valve 29 mounted within convenient reach of the operator's seat 30 and from which flexible lines 31 lead, and are connected, to pressure pipes 32 mounted and extending rearwardly along the frame side bars 10.

The grader is supported by a pair of wheels 33, each of which is disposed below the rear end portion of one of the side bars 10, each wheel axle 34 being journalled at its ends through the central journals 35 of a pair of wheel supporting bars 36 whose portions at opposite sides of the journals 35 are at an angle with respect to one another approximating a right angle.

The rear ends of the supporting bars 36 of each wheel are pivotally connected upon opposite sides of the respective frame bars 10 by transverse pivot bolts 37, and the forward ends are similarly connected to the rear free end of a piston rod 38, the piston 39 of which, as most plainly seen in Figure 8, works within a downwardly and rearwardly inclined cylinder 40 having at its upper forward end an axial lug 41 pivotally connected at 42 to supports 43 rigid with and depending from the respective side bar 10 of the frame.

The pressure pipes 32 before mentioned are connected at their rear ends with flexible pressure lines 43 entering the upper forward ends of the cylinders 40 and thus pressure may be supplied to the cylinders or relieved therefrom, through the four-way valve 29, as may be necessary to respectively raise or lower the rear portion of the main frame in operation. It is furthermore obvious that this adjustment may be accomplished with considerable facility and promptness as occasion arises by reason of the fact that the control valve 29 is mounted within the easy reach of the operator of the tractor.

The rear portion of the main frame, that is the rear portions of the side bars 10, is preferably completed by cross frame members 44 and 45 which, with the remaining portions of the frame as well as the wheel adjusting arrangement and the turntable 13 and its parts, combine to form a considerable weight for holding the cutting edge of the blade steadily and uniformly in the soil during operation and this weight, so necessary in many operations, it is proposed to increase by utilizing supporting wheels 33, as best shown in Figure 7, in the form of drums, each completely closed with the exception of a screw closure member 46, by which, when desirable or necessary, the hollow spaces within the wheels may be filled with water or other weighty fluid.

What we claim is:

1. A tractor drawn grader having a forward tractor hitch and rear supporting wheels, and including side bars, the forward portions of which are rounded in connection with one another in approximately a semicircle, a curved cross member connecting the forward ends of the side bars and forming, with their said forward rounded ends, an inwardly opening channel, provided at one point with vertically aligned openings, a turntable movable within said channel and having a series of apertures therealong for selective alignment with the openings of the said housing, an angle bolt for extension through the openings of the house and the apertures of said turntable to secure the latter in adjusted position, a pair of depending blade supporting bars in connection with said turntable, and a blade pivoted to, and having an adjustable connection with, the lower portions of said supporting bars.

2. A tractor drawn grader having rear supporting wheels and having a frame whose forward portion presents an inwardly opening channel or housing of circular form, a turntable movable within said housing, means to adjustably lock the turntable against movement in the housing, a pair of supporting bars depending from diametrically opposite portions of said turntable, a brace member connected to another portion of said turntable and having connection with said supporting bars below the turntable, and a blade having pivotal connections with the lower portions of said supporting bars and also having means adjustably in connection with the bars for varying the inclination of the blade with respect to the bars.

3. A tractor drawn grader having rear supporting wheels and a main frame provided at its forward portion with a tractor hitch, said frame including spaced apart side bars in connection with one another at their forward ends, and a curved cross member forming, with the connected forward ends of the frame bars, a turntable housing, a turntable adjustable within said housing, means for locking the turntable in adjusted position, depending braced supports carried by the turntable, and a blade in pivotal adjustable connection with said supports.

4. A tractor drawn grader including a frame having a tractor hitch at its forward end, a blade beneath and in adjustable connection with the forward portion of the frame, rear wheels below the rear side portions of the frame, a pair of angular wheel supporting bars intermediate the ends of which the wheels are journalled, said bars having upwardly extending forward and rear ends of which said rear ends are in pivotal connection with the rear side portions of the frame, pressure cylinders, each in pivotal connection with one side portion of the frame forwardly of the wheels, pistons in said cylinders having rods pivotally connected at the rear ends thereof to the said forward ends of the supporting bars of the wheels, pressure supply means, and valved pressure control connections leading from said supply means into the said cylinders forwardly of the pistons thereof.

5. A tractor drawn grader including a frame having spaced apart side bars and a forward tractor hitch, a blade beneath, and in adjustable connection with, the forward portion of said frame, wheels beneath the rear side portions of the frame, angular supporting bars having journals intermediate their ends for the wheels and having upwardly and rearwardly inclined portions in pivotal connection with the rear portions of the frame side bars, pressure cylinders in pivotal connection at their forward ends with the side bars of the frame and inclined rearwardly and downwardly below the frame, pistons in said cylinders having rearwardly projecting rods in pivotal connection with the upper forward ends of the wheel supporting bars, tractor actuated pressure supply means, pressure supply lines connecting said supply means with the said cylinders forwardly of the pistons of the latter, and a control valve in said supply means mounted adjacent to the operator's station of the tractor for independently controlling the pressure supply to, and relief from, the said cylinders.

JAMES PLEASANT IVY.
JOHN J. ALLISON.